Patented Apr. 20, 1954

2,676,164

UNITED STATES PATENT OFFICE 2,676,164

COATED NYLON FABRICS

William Charlton and Evan Guy Rutter, Blackley, Manchester, England, assignors to Imperial Chemical Industries Limited, a corporation of Great Britain No Drawing. Application February 26, 1951, Serial No. 212,841

Claims priority, application Great Britain March 9, 1950

10 Claims. (Cl. 260—75)

This invention relates to coated nylon fabrics.

In British specification No. 573,932 there is disclosed a process for uniting an active hydrogen containing polymeric material to the surface of an article composed of a different active hydrogen containing material by bringing the two polymeric materials together in the presence of an organic polyisocyanate. Among the active hydrogen containing polymeric materials therein mentioned are polyhydric alcohol-polybasic acid condensation products and high molecular weight polyamides, i. e. nylon. Also mention is made of treating the article in the form of a fabric.

The present invention is directed to the treatment of nylon fabrics with a particular polyhydric alcohol-polybasic acid condensation product together with a particular organic polyisocyanate whereby coated fabrics are obtained which are devoid of colour, which have a pleasing handle and drape, which have an excellent resistance to solvents, alkalis, acids or to detergent fluids. Furthermore, the coated materials exhibit an unusual freedom from cracking or crazing when they are creased, even at very low temperatures, and when the materials are creased, the creases are removable simply by means of a conventional ironing operation.

According to the invention we provide coated nylon fabric, said coating being provided by applying to the nylon fabric a composition comprising a polyester from adipic acid and ethylene glycol and glycerol, an aromatic hydrocarbon diisocyanate and a solvent, removing the solvent, and subjecting the fabric to a heat treatment.

The polyester may be formed in any conventional manner, most conveniently by condensing a mixture of ethylene glycol, glycerol and adipic acid. It is desirable that the condensation should be continued until the acid value has fallen to below 10 milligrams of KOH per gram, preferably to below 6 milligrams of KOH per gram. Since some polyhydric alcohol may be carried away with the water liberated during the condensation, the hydroxyl value of the product may be below the theoretical value, and, according to the conditions of condensation employed, this may be obviated by an appropriate increase in the charge of ethylene glycol and/or glycerol. Preferably, the final products should have a hydroxyl content of 4 to 7%. Excellent results are obtained when using a product having an acid value of 5 to 6.5 milligrams of KOH per gram and a hydroxyl content of 4 to 6%, and having, when freshly prepared, a viscosity of 100 to 200 poises at 20° C., although very satisfactory results may be achieved with products whose characteristics are outside of but approach these ranges.

Preferably, about 3 molecular proportions of ethylene glycol and three molecular proportions of adipic acid are used per molecular proportion of glycerol but, if desired, other proportions may be employed. Using the proportions mentioned, the product crystallises only slowly, does not form a hard mass, and remains easily handled. Using higher proportions of ethylene glycol to glycerol, for example, molecular proportions of 6:1, the products crystallise readily. Using lower proportions of ethylene glycol to glycerol, for example, molecular proportions of 1:1.7, the products appear to be less soluble in ester solvents, and may show a tendency to gelation.

Any aromatic hydrocarbon diisocyanate may be used, for example m-phenylene diisocyanate and toluylene-2:4-diisocyanate. The amount of diisocyanate is usually, from 20% to 40% by weight on the weight of the polyester.

Any suitable solvent for the polyester may be used, but, preferably, it should be one which is readily removed by volatilisation from the treated fabrics and one which does not interact with the diisocyanate by virtue of even a low content of water or other hydroxylic substance. Suitable solvents are butyl acetate, ethyl acetate, methyl ethyl ketone, methyl isobutyl ketone, methylcyclohexanone, and mixtures containing these liquids or other diluents, for example benzene.

The heat treatment serves to cause the interaction of the ingredients of the composition with each other and/or with the nylon, and is usually from 15 minutes to an hour or so at temperatures of from 120° C. to 90° C.

Additional ingredients such as a pigment or a natural or synthetic hydrocarbon wax, such as polythene, may be included in the composition. A plasticiser, such as dibutyl phthalate, may be added if desired.

Conveniently, the coated fabric is made by first mixing together a solution of the polyester and the aromatic hydrocarbon diisocyanate, passing the fabric through the solution, removing the solvent, and stoving for 30–60 minutes at 100° C. or for a shorter time at higher temperatures. If desired, the composition may be applied by spraying, brushing or spreading or by any other conventional coating operation.

Prior to or during or after the heat treatment the coating may be polished, for example, by a calendering operation, or embossed effects may be obtained, for example, by means of an embossing calender.

The coated fabric of the invention finds wide utility for all purposes where a flexible, impermeable fabric is required.

The invention is illustrated but not limited by the following examples, in which parts are expressed by weight.

*Example 1*

A mixture is made of 45 parts of a mixed polyester from adipic acid and ethylene glycol and glycerol, 22 parts of butyl acetate, 16.5 parts of ethyl acetate, 16.5 parts of benzene and 11.25 parts of toluylene-2:4-diisocyanate. A clear solution is obtained.

Nylon fabric is passed through the solution at the rate of about 12" per minute, allowed to drain and then passed through an oven heated to 100° C. at such a rate that the fabric is in the oven for a period of about 35 minutes.

There is thus obtained a semi-transparent coated fabric, with a pleasing handle and drape, resistant to the action of solvents, alkalis, acids and hot or cold aqueous detergent fluids, with a freedom from marring or crazing on folding or creasing, and which, when creased, can be restored to a smooth condition by a conventional hot iron operation.

The mixed polyester employed in this example is obtained as follows:

430 parts of glycerol, 917 parts of ethylene glycol and 2000 parts of adipic acid are charged into an aluminium or stainless steel kettle provided with a carbon dioxide inlet tube, a thermometer pocket, an anchor type agitator and a distillation condenser. The mixture is heated during 1 to 2 hours up to 200° C., stirring being started as soon as is possible; a clear solution is formed when the temperature reaches about 102° C. Carbon dioxide is passed continuously in a slow stream and serves to prevent deterioration of the colour of the product. The heating is continued at 20° C., and after 4½ to 8½ hours, when the acid value of the polyester has fallen to just below 6 milligrams of KOH per gram, the product is discharged at about 150° C. On cooling, there is obtained a pale yellow, viscous liquid having a viscosity of the order of 200 poises at 20° C., and a hydroxyl content of approximately 6%.

*Example 2*

Two polyesters (A) and (B) are made in the manner described in the preceding example, but with different ratios of glycol to glycerol.

(A) 63 parts of glycerol, 73 parts of ethylene glycol and 200 parts of adipic acid are condensed at 200° C. for 7 hours, when the acid value has fallen to 5.6 mg. KOH/g.

(B) 24 parts of glycerol, 109 parts of ethylene glycol and 200 parts of adipic acid are condensed at 200° C. for 9 hours, when the acid value has fallen to 7.6 mg. KOH/g.

A mixture of these resins, in the proportion of 2 parts of (A) to 1 part of (B), applied with 40% by weight of toluylene-2:4-diisocyanate to nylon fabric, in the manner described in the preceding example, gives an attractive finish with a good handle.

What we claim is:

1. Coated fabric constituting high molecular weight polyamides as claimed in claim 7 wherein the polyester in said composition has a hydroxyl content of 4 to 7%.

2. Coated fabric constituting high molecular weight polyamides as claimed in claim 7 wherein the polyester in said composition contains about 3 molecular proportions of ethylene glycol per molecular proportion of glycerol.

3. Coated fabric constituting high molecular weight polyamides as claimed in claim 7 wherein the polyester in said composition contains about 3 molecular proportions of adipic acid per molecular proportion of glycerol.

4. The composition of claim 10, wherein the polyester is a condensation product of ethylene glycol, glycerol and adipic acid having an acid value below 6 milligrams of KOH per gram.

5. The composition of claim 10, wherein the polyester has a hydroxyl content of 4 to 7%.

6. The composition of claim 10, wherein the polyester contains about three molecular proportions of ethylene glycol and about three molecular proportions of adipic acid per molecular proportion of glycerol.

7. Coated fabric constituting high molecular weight polyamides, the coating comprising the reaction product resulting from the heat treatment of said fabric coated with a composition comprising (1) a polyester obtained from adipic acid in amount sufficient to give said polyester an acid number below 10 milligrams of KOH per gram, ethylene glycol and glycerol in the ratio of from about 2.6 to 6 moles of ethylene glycol per mole of glycerol, (2) an aromatic hydrocarbon diisocyanate in an amount constituting from 20 to 40% by weight of the polyester and (3) a solvent for the polyester.

8. Coated fabric constituting high molecular weight polyamides as claimed in claim 7 wherein the polyester has an acid value below 6 milligrams of KOH per gram.

9. A process for coating fabric constituting high molecular weight polyamides which comprises applying to the fabric a composition comprising (1) a polyester obtained from adipic acid in amount sufficient to give said polyester an acid number below 10 milligrams of KOH per gram, ethylene glycol and glycerol in the ratio of from about 2.6 to 6 moles of ethylene glycol per mole of glycerol, (2) an aromatic hydrocarbon diisocyanate in an amount constituting from 20 to 40% by weight of the polyester and (3) a solvent for the polyester, removing the solvent and subjecting said fabric to a heat treatment.

10. A composition comprising (1) a polyester obtained from adipic acid in amount sufficient to give said polyester an acid number below 10 milligrams of KOH per gram, ethylene glycol and glycerol in the ratio of from about 2.6 to 6 moles of ethylene glycol per mole of glycerol, (2) an aromatic hydrocarbon diisocyanate in an amount constituting from 20 to 40% by weight of the polyester and (3) a solvent for the polyester.

References Cited in the file of this patent

UNITED STATES PATENTS

| Number | Name | Date |
| --- | --- | --- |
| 2,282,827 | Rothrock | May 12, 1942 |
| 2,289,222 | Spanagel | July 7, 1942 |
| 2,333,639 | Christ et al. | Nov. 9, 1943 |
| 2,370,362 | Light | Feb. 27, 1945 |
| 2,503,209 | Nyquist et al. | Apr. 4, 1950 |

FOREIGN PATENTS

| Number | Country | Date |
| --- | --- | --- |
| 573,932 | Great Britain | Dec. 13, 1945 |